United States Patent Office 3,532,773
Patented Oct. 6, 1970

3,532,773
PREPARATION OF HETEROGENEOUS CHLORINATED POLYVINYL CHLORIDE
Hans-Ewald Konermann, Oberlar, and Gerhard Bier, Troisdorf, Germany, assignors to Dynamit Nobel Aktiengesellschaft, Troisdorf, Germany
No Drawing. Filed May 17, 1966, Ser. No. 550,634
Claims priority, application Germany, May 26, 1965, D 47,366
Int. Cl. C08f 27/02
U.S. Cl. 260—899                                         2 Claims

ABSTRACT OF THE DISCLOSURE

Process of manufacturing shaped articles from thermoplastic mixtures on the basis of post-chlorinated polyvinylchloride comprising subjecting to heat and deformation a mixture of post-chlorinated polyvinylchloride having a heterogenously adjusted chlorine content produced by introducing not yet chlorinated polyvinylchloride into the chlorination reaction zone and/or removing partially post-chlorinated polyvinylchloride from the chlorination reaction zone wherein during said addition and/or removal from 5 to 100% of the quantity of chlorine required for the chlorination reaction is converted.

---

This invention relates to a method for the production of shaped articles from thermoplastic compositions on a basis of post-chlorinated polyvinylchloride, and to the products produced thereby.

In co-pending application Ser. No. 424,140, filed Jan. 7, 1965, now issued to U.S. Pat. No. 3,364,163, there is disclosed a method of producing shaped articles from thermoplastic compositions on a basis of post-chlorinated polyvinylchloride which is characterized by the fact that there is used therein, as starting material, mixtures of post-chlorinated polyvinylchlorides having a heterogeneosuly adjusted chlorine content averaging between about 60 to about 70% and which consists of an approximately 5 to 50% mixture of two or more components having different chlorine contents in each instance, and, namely, contents which differ from the average chlorine content of the mixture by an amount of ±0.5 to ±14%.

In accordance with the invention, it has now been found that shaped articles can be produced from thermoplastic compositions on a basis of post-chlorinated polyvinylchloride having advantageous properties; for example, as regards their working and absence of any tendency toward shrinkage, the greater is the number of post-chlorinated ployvinylchloride components having different chlorine contents employed in the mixture used as starting material. Such post-chlorinated polyvinylchloride mixtures are produced in a most simple manner through the continuous introduction of not yet post-chlorinated polyvinylchloride into the chlorination reactor during the chlorination of polyvinylchloride and/or by removing partially post-chlorinated polyvinylchloride from the said chlorination reactor during the chlorination reaction.

The introduction of the polyvinylchloride or the removal of the partially chlorinated polyvinylchloride is regulated so that about 5 to 100% of the quantity of chlorine required for obtaining the desired average chlorine content values, i.e., post-chlorinated polyvinylchloride having a chlorine content of between 60 and 70%, is converted.

Withdrawal of partially chlorinated polyvinylchloride takes place with equally satisfactory results at the commencement of the chlorination, as well as after the chlorination has been started up. The termination of the introduction of polyvinylchloride can take place at any point up to the completion of the chlorination.

The amounts of material introduced or withdrawn during the chlorination can be equal to the total or to only a part of the starting materials required to effect the desired chlorination, and the withdrawal similarly can amount to all or part of the chlorination product to be produced.

These measures result when applied individually or in combination to an enlargement of the resistance time spectrum of the polymer particles in the chlorination.

The non-uniformity of the chlorine compounds which thereby results, i.e., by the introduction of polyvinylchloride or by removal of partially chlorinated polyvinylchloride, has a favorable effect on the properties of the shaped articles, as, for instance, in connection with the processibility and the tendency towards shrinkage of the chlorinated polyvinylchloride. This can be seen from the table which is set out hereinafter in which a comparison of the properties of the post-chlorinated polyvinylchloride of uniform chlorine content and having a similar Vicat dimensional stability (designated as Sample C in the table) with samples of heterogeneous chlorine content produced in accordance with the invention (Samples A and B) and with a mixture of post-chlorinated polyvinylchloride composed of three components having different chlorine contents but the same Vicat value (Sample D).

The production of the shaped articles in accordance with the invention on the basis of post-chlorinated polyvinylchloride having a heterogeneously adjusted chlorine content is carried out under addition of the conventional and commercially available auxiliary substances such as, for example, stabilizers; for instance, barium-cadmium-laurate, and lubricants as, for instance, calcium stearate.

The chlorination of the polyvinylchloride advantageously takes place in aqueous suspension under use of initiators such as, for example, ultra-violet light, and under addition of swelling agents, preferably chloroform, at a temperature between room temperature and a temperature below the boiling point of the lowest boiling component in the reaction system.

The method and products thereof in accordance with the invention are illustrated by the following example: It is not intended, however, that the scope of the invention be in any wise limited thereby.

EXAMPLE

Samples A and B represented polyvinylchloride batches having a heterogeneously adjusted chlorine content amounting to 66.8% and 66.3%, respectively.

Sample C represenuted a polyvinylchloride batch having a homogeneously adjusted chlorine content of 65.9%.

Sample D represented a post-chlorinated polyvinylchloride having a heterogeneously adjust chlorine content of 65.8% formed from three components having chlorine contents of 68.8%, 62.5%, and 65.9%, respectively.

The clorination resulting in the production of the products on the basis of which Samples A, B, C and D were prepared was carried out in a 4-liter glass round-bottom flask provided with a stirrer, gas inlet tube, and gas outlet opening.

The chlorination reaction mixture consisted of 320 g. polyvinylchloride having a K-value of 68, 1200 g. water, and 120 g. chloroform.

The chlorination was carried out by introducing chlorine under irradiation from a 70-watt UV-lamp at a temperature of between 45 and 48° C., while intensively stirring the reaction mixture. The chlorination resulting in the production of Samples C–D was carried out by introducing chlorine until the indicated chlorine content had been obtained. The production of the chlorination product forming the basis of Sample A (in accordance with the invention) took place by continuously withdrawing partially chlorinated polyvinylchloride after the chlorine contentt of 63.2% had been reached and under continuation of the chlorination until the complete emptying of the chlorination reactor. The chlorination product was withdrawn at the end of the chlorination directly before the complete emptying of the reactor at a chlorine content of 69.3% while the average chlorine content of the entire chlorination product amounted to 66.8%.

The production of the chlorination product of Sample B (in accordance with the invention) took place by the continuous introduction of polyvinylchloride into the chlorination reactor, the reaction and addition having been begun simultaneously. The uniform addition of the polyvinylchloride was completed at a chlorine consumption of 50.4 g. (28%). The chlorination was completed following the addition of a further 129.8 g. (72%) of chlorine. The average chlorine content of the chlorination product amounted to 66.3%.

All of the chlorination products were thereafter worked up by identical procedures, i.e., by steam distillation and subsequent drying at 60° C.

Samples A, B, C, and D were worked following the addition of 3% barium-cadmium-laurate as stabilizer and 1% calcium stearate as lubricant on rolls at 170° C. to form a rolled sheet having a thickness of 1 mm. The time taken for the rolling amounted to 5 minutes. The determination of the shrinkage values was carried out in the direction of rolling on the rolled sheets having an original length of 500 mm. following storage for 20 minutes in a drying oven maintained at a temperature of 170° C.

TABLE

| Sample | Clorine content, percent | Vicat (° C.) | Shrinkage, percent (at 170° C.) | Rolled sheet |
|---|---|---|---|---|
| A | 66.8 (heterogeneous: 63.2–69.3). | 119 | 2.5 | Smooth. |
| B | 66.3 (heterogeneous) | 118 | 2.9 | Do. |
| C | 65.9 (homogeneous) | 120 | 40.4 | Very rough. |
| D | 65.8 (17.5%:68.8% Cl; 17.5%:62.5% Cl; 65.0%:65.9% Cl). | 120 | 30.7 | Rough |

What is claimed is:

1. In the post-chlorination of a polyvinyl chloride resin by introducing a resin feed into a reaction zone and chlorinating the same in aqueous suspension and recovering a post-chlorinated product having an average chlorine content in the range of 60 to 70 percent; the improvement comprising, adjusting the rate of addition of said resin feed to and/or the the withdrawal of said post-chlorinated product from said reaction zone during the time when from 5 to 100 percent of the quantity of chlorine required to achieve said average chlorine content is consumed to produce a post-chlorinated product having a heterogeneous chlorine content composed of a mixture of fractions chlorinated to different levels, at least one of which has a chlorine content substantially higher than said average chlorine content, at least another of which has a chlorine content substantially lower than said average chlorine content, and all of which have a chlorine content greater than the chlorine content of said feed.

2. The process of claim 1 wherein said post-chlorination is carried out in the presence of a swelling agent for said resin feed and ultra-violet light, and at a temperature of from room temperature up to a temperature just below the boiling temperature of the lowest boiling component present in said reaction zone, aside from the chlorine.

References Cited

UNITED STATES PATENTS

| 2,422,919 | 6/1947 | Myles et al. | 204—159.8 |
| 2,996,489 | 8/1961 | Dannis et al. | 260—92.8 |
| 3,100,762 | 8/1963 | Shockney | 260—92.8 |
| 3,328,371 | 6/1967 | Beer | 260—92.8 |
| 3,328,490 | 6/1967 | Buning et al. | 260—899 |
| 3,341,628 | 9/1967 | Buning et al. | 260—899 |
| 3,364,163 | 1/1968 | Kraemer et al. | 260—23 |

DONALD E. CZAJA, Primary Examiner

R. A. WHITE, Assistant Examiner

U.S. Cl. X.R.

204—159.18; 260—23, 92.8